United States Patent [19]

Steffes

[11] E Patent Number: Re. 32,740

[45] Reissued Date of Patent: Aug. 30, 1988

[54] MULTIPLE USE SHELF FOR COOLER

[75] Inventor: William J. Steffes, Wichita, Kans.

[73] Assignee: The Coleman Company, Inc., Wichita, Kans.

[21] Appl. No.: 42,900

[22] Filed: Apr. 27, 1987

Related U.S. Patent Documents

Reissue of:

[64] Patent No.: 4,515,421
Issued: May 7, 1985
Appl. No.: 548,978
Filed: Nov. 7, 1983

[51] Int. Cl.[4] ..... A47B 96/02

[52] U.S. Cl. ..... 312/351; 62/457; 312/214

[58] Field of Search ..... 312/214, 241, 244, 350, 312/351; 220/223; 248/207, 558; 62/457; 108/61, 152; 190/9, 16, 109, 110

[56] References Cited

U.S. PATENT DOCUMENTS

| | | | |
|---|---|---|---|
| 1,019,950 | 12/1911 | Prather . | |
| 1,487,856 | 3/1924 | Hauserman et al. | 312/351 |
| 1,833,081 | 11/1931 | Kilmer | 312/351 |
| 3,145,646 | 8/1964 | Levy . | |
| 3,680,235 | 8/1972 | Leemhuis | 108/152 |
| 3,807,572 | 4/1974 | Luvasa et al. | 108/61 |
| 4,124,262 | 11/1978 | Schill . | |
| 4,307,581 | 12/1981 | Reid | 62/457 |
| 4,377,076 | 3/1983 | Staudt et al. | 62/457 |
| 4,539,722 | 9/1985 | Broussard . | |
| 4,561,704 | 12/1985 | Smith . | |

*Primary Examiner*—Joseph Falk

[57] ABSTRACT

A shelf and a cooler are constructed so that the shelf can be supported in vertical or horizontal positions within the cooler, in a horizontal position on one of the handle assemblies of the cooler, or on top of the lid of the cooler.

8 Claims, 2 Drawing Sheets

FIG. 6
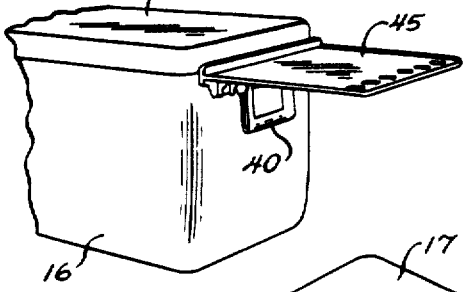
FIG. 7
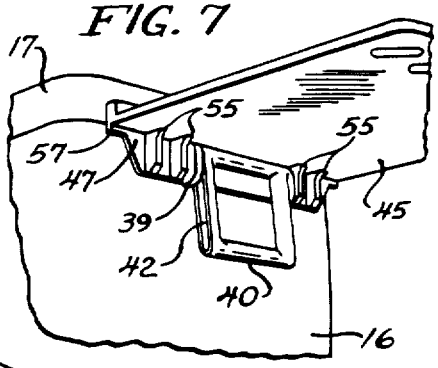
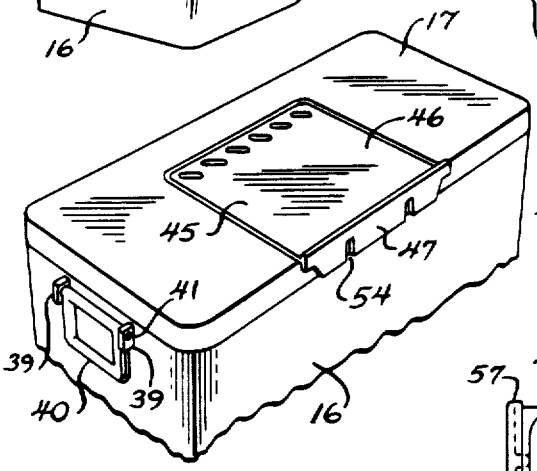
FIG. 8
FIG. 9
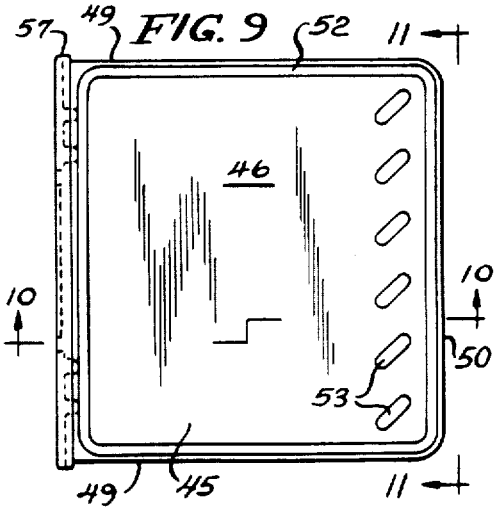
FIG. 11
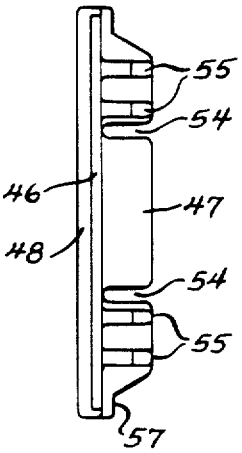
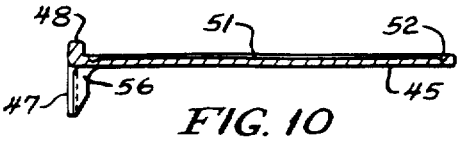
FIG. 10

MULTIPLE USE SHELF FOR COOLER

Matter enclosed in heavy brackets [ ] appears in the original patent but forms no part of this reissue specification; matter printed in italics indicates the additions made by reissue.

BACKGROUND AND SUMMARY

This invention relates to coolers, and, more particularly, to a cooler and a shelf which can be supported by the cooler in multiple positions.

Coolers are commonly used by picnickers and campers for maintaining food and beverages cold. The invention increases the versatility of a cooler by permitting a shelf to be supported by the cooler in a number of different positions. The shelf can be supported:

(a) in a vertical position within the cooler to act as a partition for maintaining food or ice in one part of the cooler;

(b) in a horizontal position within the cooler to support food above the bottom of the cooler;

(c) in a horizontal position on one of the handle assemblies of the cooler;

(d) on the top of the lid of the cooler to act as a cutting board; and (e) in a vertical position near either inside wall where minimum space is used when storing the shelf.

DESCRIPTION OF THE DRAWING

The invention will be explained in conjunction with an illustrative embodiment shown in the accompanying drawing, in which—

FIG. 6 is a fragmentary perspective view showing the shelf supported by one of the handle assemblies of the cooler;

FIG. 7 is a fragmentary perspective view of the shelf and handle assembly from a different angle;

FIG. 8 is a fragmentary perspective view showing the shelf supported on top of the lid of the cooler;

FIG. 9 is a top plan view of the shelf;

FIG. 10 is a sectional view of the shelf taken along the line 10—10 of FIG. 9; and FIG. 11 is an elevational view taken along the line 11—11 of FIG. 9.

DESCRIPTION OF SPECIFIC EMBODIMENT

Figure 1:
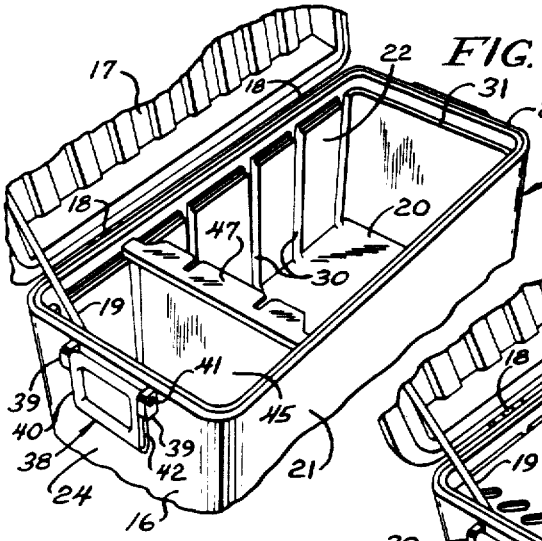
FIG. 1 is a fragmentary perspective view of a cooler and a shelf formed in accordance with the invention, the shelf being supported in a vertical position within the cooler.

Referring first to FIGS. 1-5, the numeral 15 designates generally a cooler having a chest or bottom portion 16 and a lid 17 which is attached to the chest by hinges 18. A strap 19 is connected to the chest and the lid and prevents the lid from opening beyond the position shown in FIGS. 1 and 2. The chest includes a bottom wall 20, parallel front and back walls 21 and 22, and parallel end walls 23 and 24.

The chest 16 may be constructed in the conventional manner from an outer shell or case 26 (FIGS. 4 and 5) and an inner liner 27. The case and the liner are secured around their upper edges, and the space between the case and the liner is filled with insulating plastic foam 28. Both the case and the liner may advantageously be molded from plastic.

The inside surfaces of the front and back walls of the cooler are provided with a plurality of vertically extending grooves 30. The grooves in the front wall are aligned with the grooves in the back wall. The inside surface of each of the four walls of the cooler extends outwardly adjacent the top of the cooler to provide a shoulder or ledge 31.

The inside surface of the cooler is provided by the liner 27, and the grooves 30 and the shoulder 31 can be formed by injection molding the liner with the appropriate shape. The molded liner has a bottom surface 32 (FIGS. 4 and 5) and upwardly extending generally flat front, back, and end surfaces 33, 34, 35, and 36. The flat surfaces extend outwardly and upwardly to provide the shoulder 31, and the grooves 30 interrupt the flat front and back surfaces 33 and 34.

A handle assembly 38 is mounted on each of the end walls 23 and 24 of the cooler. The details of the handle assemblies are described in U.S. Pat. No. 4,095,711. Each handle assembly includes a pair of mounting brackets 39 which are mounted at horizontally spaced locations on the end wall of the case 26. A square handle 40 is pivotally and slidably mounted between the mounting brackets by mounting pins 41 which extend through the mounting brackets. Each pin is positioned within a groove 42 in the side of the handle.

A shelf 45 is supportable within and on the cooler in a variety of positions. Referring to FIGS. 9-11, the shelf includes a generally flat and generally rectangular panel 46, a downwardly extending ledge 47 which extends perpendicularly to the panel 46, and an upwardly extending shoulder 48 which also extends perpendicularly to the panel 46. The panel 46 includes a pair of parallel side edges 49, a perpendicular end edge 50, and a downwardly extending tongue 57 at each end. The central portion 51 of the panel is recessed below the outer edges of the panel (see FIG. 10). A perimetric groove 52 is recessed further into the panel adjacent the outer edges. A plurality of angularly extending slots or openings 53 extend through the panel adjacent the end edge 50. A pair of slots 54 are provided in the ledge 47, and the portions of the ledge outwardly of the slots are reinforced by ribs 55.

The width dimension of the shelf 45 between the side edges 49 is such that the side edges can be inserted into and retained by the grooves 30 in the front and back walls of the cooler as shown in FIG. 1. The shelf is thereby held in a vertical position and acts as a partition to form a compartment between the shelf and the adjacent end wall. The compartment can be used for storing and separating ice, food, or beverages from the remainder of the cooler. When ice is held back by the shelf, articles can be removed from and returned to the other part of the cooler without interference from the ice. Although the ice is retained by the shelf, cold water is allowed to flow through the shelf by the openings 53. The grooves 30 in the front and back walls of the cooler are aligned in pairs, and the shelf can be inserted into any desired pair of grooves to form a compartment of the desired size.

Figure 2:
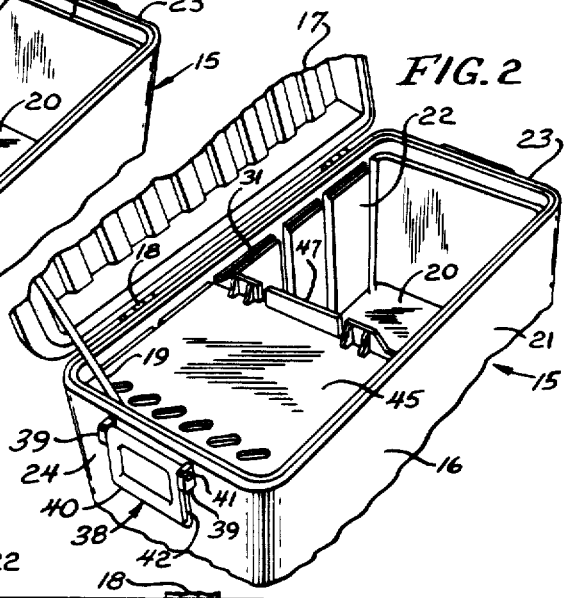
FIG. 2 is a fragmentary perspective view showing the shelf supported in a horizontal position within the cooler.
Figure 3:
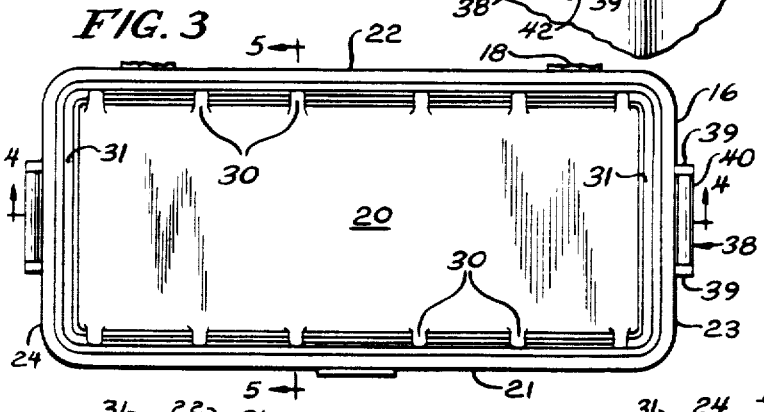
FIG. 3 is a top plan view of the cooler.
Figure 4:
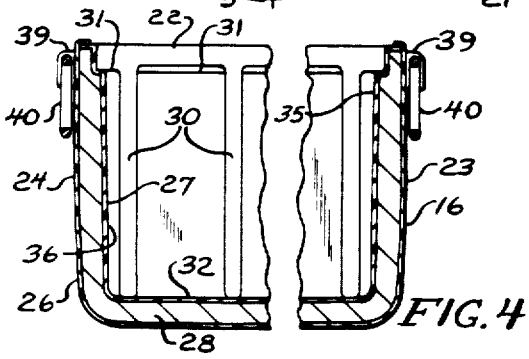
FIG. 4 is a sectional view, partially broken away, taken along the line 4—4 of FIG. 3.
Figure 5:
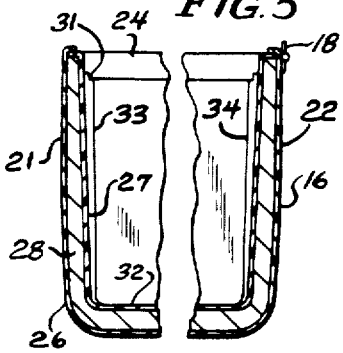
FIG. 5 is a sectional view, partially broken away, taken along the line 5—5 of FIG. 3.

The dimension of the shelf between the side edges 49 is also such that the side edges can be supported in a horizontal position by the shoulder 31 on the front and back walls as shown in FIG. 2. The tongues 57 restrain the tray from horizontal movement by engaging a pair of opposing grooves 30 on the front and back walls. In this position the shelf serves as a tray for supporting food above the bottom of the cooler and maintaining the food dry. The ledge 47 retains the food on the shelf.

The shelf can be supported by either of the handle assemblies for use as a utility shelf as shown in FIGS. 6 and 7. The slots 54 in the ledge 47 of the shelf are spaced apart the same distance as the mounting brackets 39 of the handle assembly. The slots 54 are inserted over the mounting brackets 39, and the portion of the ledge 47 between the slots is inserted into the space between the handle 40 and the end wall of the cooler. The shelf is thereby supported in cantilever fashion by the mounting brackets and the handle without requiring any special hardware. The shelf can be removed simply by lifting the shelf away from the mounting brackets and the handle.

The shelf can serve as a cutting board by supporting the shelf on the top of the lid 17 when the lid is closed as shown in FIG. 8. The flat panel 46 of the shelf is supported by the lid, and the ledge 47 extends downwardly over the front edge of the lid to prevent the shelf from moving toward the back.

The shelf 45 is advantageously integrally injection molded from inexpensive plastic, such as polypropylene. The plastic can be foamed to provide the desired thin wall sections, and the balance of the shelf can be thicker to provide added rigidity and enhanced appearance.

While in the foregoing specification a detailed description of a specific embodiment of the invention was set forth for the purpose of illustration, it will be understood that many of the details herein given may be varied considerably by those skilled in the art without departing from the spirit and scope of the invention.

I claim:

1. In combination:

a cooler having a horizontally extending bottom wall, parallel front and back walls extending upwardly from the bottom wall, and parallel end walls extending between the front and back walls, each of the front and back walls having an inside surface which is provided with vertically extending retaining means for holding a shelf in a vertical position and horizontally extending supporting means for holding a shelf in a horizontal position, and a pair of handle assemblies mounted on a pair of walls of the cooler, each of the handle assemblies including a pair of mounting brackets which are spaced apart in a horizontal direction and a handle which is positioned between the mounting brackets and is supported thereby, and a generally flat, generally rectangular shelf *having* a pair of parallel side edges, the side edges being engageable with the retaining means on the front and back walls of the cooler when the shelf is retained in a generally vertical position, the side edges being engageable with the supporting means on the front and back walls of the cooler when the shelf is supported in a generally horizontal position, the shelf including a ledge which extends generally perpendicularly from one side thereof, the ledge having a pair of recesses which are spaced apart the same distance as the mounting brackets of the handle assemblies whereby the shelf can be supported in a generally horizontal position by inserting the recesses of the ledge over the mounting brackets of one of the handle assemblies.

2. The structure of claim 1 in which the cooler includes a lid hingedly connected to one of the walls thereof, the generally flat portion of the shelf being engageable with the lid to provide a cutting board and the ledge being engageable with the side of the lid to prevent the shelf from sliding in at least one direction with respect to the lid.

3. The structure of claim 1 in which each of the inside surfaces of the front and back walls of the cooler is provided with an outwardly extending groove which provides said retaining means, the side edges of the shelf being insertable into the grooves in the front and back walls.

4. The structure of claim 1 in which each of the inside surfaces of the front and back walls of the cooler is provided with a horizontally extending ledge which provides said horizontally extending supporting means.

5. The structure of claim 1 in which each of the inside surfaces of the front and back walls of the cooler includes a generally flat vertically extending portion which extends upwardly from the bottom wall and an outwardly extending shoulder portion adjacent the upper end of the front or back wall, the shoulder portions of the front and back walls providing said supporting means, each of the flat vertically extending portions of the inside surfaces of the front and back walls being provided with a plurality of vertically extending grooves which provide said retaining means, the side edges of the shelf being insertable into the grooves in the front and back walls.

6. The structure of claim 1 in which the ledge includes a downwardly extending portion engageable with one of the vertically extending retaining means when the shelf is in the horizontal position whereby the shelf is restrained from horizontal motion.

7. In combination:

a cooler having a horizontally extending bottom wall, parallel front and back walls extending upwardly from the bottom wall, and parallel end walls extending oetween the front and back walls, each of the front and back walls having an inside surface which is provided with vertically extending retaining means for holding a shelf in a vertical position and horizontally extending supporting means for holding a shelf in a horizontal position, and a generally flat shelf having a pair of side edges, the side edges being engageable with the retaining means on the front and back walls of the cooler when the shelf is retained in a generally vertical position, the side edges being engageable with the supporting means on the front and back walls of the cooler when the shelf is supported in a generally horizontal position, the shelf including at least one tongue which extends generally perpendicularly to the generally flat surface of the shelf so as to engage one of the vertically extending retaining means whereby the shelf is restrained from horizontal movement when in the horizontal position.

*8. In combination:*

*a cooler having a horizontally extending bottom wall, parallel front and back walls extending upwardly from the bottom wall, and parallel end walls extending between the front and back walls, each of the front*

*and back walls having an inside surface which is provided with vertically extending retaining means for holding a shelf in a vertical position and horizontally extending supporting means for holding a shelf in a horizontal position, and a pair of handle assemblies mounted on a pair of walls of the cooler, each of the handle assemblies including a pair of mounting brackets which are spaced apart in a horizontal direction and a handle which is positioned between the mounting brackets and is supported thereby, and*

*a generally rectangular shelf having two pairs of parallel side edges, two of the side edges being engageable with the retaining means on the front and back walls of the cooler when the shelf is retained in a generally vertical position, the side edges being engageable with the supporting means on the front and back walls of the cooler when the shelf is supported in a generally horizontal position, the shelf including a ledge which extends from one side thereof and which is insertable between one of the handles and the associated walls of the cooler whereby the shelf can be supported in a generally horizontal position on the outside of the cooler.*

* * * * *